(12) United States Patent
Bouchard et al.

(10) Patent No.: US 8,216,641 B2
(45) Date of Patent: Jul. 10, 2012

(54) METHOD OF FABRICATING CARBON FIBER REINFORCED COMPOSITE MATERIAL PARTS

(75) Inventors: Eric Bouchard, Four (FR); Eric Lherm, Rignieux le Franc (FR)

(73) Assignee: Messier Bugatti, Velizy Villacoublay (FR)

( * ) Notice: Subject to any disclaimer, the term of this patent is extended or adjusted under 35 U.S.C. 154(b) by 1200 days.

(21) Appl. No.: 12/011,527

(22) Filed: Jan. 28, 2008

(65) Prior Publication Data

US 2009/0139808 A1 Jun. 4, 2009

(30) Foreign Application Priority Data

Nov. 30, 2007 (FR) ...................................... 07 59465

(51) Int. Cl.
*C23C 16/26* (2006.01)
(52) U.S. Cl. ............... 427/249.1; 427/249.2; 427/249.3; 427/249.4
(58) Field of Classification Search ............... 427/249.1, 427/249.2, 249.3, 249.4
See application file for complete search history.

(56) References Cited

U.S. PATENT DOCUMENTS

| | | | | |
|---|---|---|---|---|
| 4,983,451 | A * | 1/1991 | Sugino et al. ................ | 442/388 |
| 5,362,228 | A * | 11/1994 | Vaudel .......................... | 432/120 |
| 5,405,560 | A | 4/1995 | Chareire et al. | |
| 5,792,715 | A | 8/1998 | Duval et al. | |
| 5,846,611 | A * | 12/1998 | Christin ....................... | 427/543 |
| 6,183,583 | B1 * | 2/2001 | Duval et al. .................. | 156/148 |
| 6,323,160 | B1 * | 11/2001 | Murdie et al. ................ | 508/109 |
| 6,405,417 | B1 * | 6/2002 | Sheehan et al. ................ | 28/107 |
| 6,410,088 | B1 * | 6/2002 | Robin-Brosse et al. ... | 427/249.2 |
| 6,767,602 | B1 * | 7/2004 | Duval et al. .................. | 428/36.1 |
| 6,953,605 | B2 * | 10/2005 | Sion et al. .................... | 427/248.1 |
| 7,182,980 | B2 * | 2/2007 | Goujard et al. ............. | 427/249.3 |
| 2003/0136502 | A1 * | 7/2003 | Lavasserie et al. ........... | 156/253 |

(Continued)

FOREIGN PATENT DOCUMENTS

EP 0 946 461 B1 10/1997

(Continued)

OTHER PUBLICATIONS

Li, He-Jun, et al., "Densification of unidirectional carbon-carbon composites by isothermal chemical vapor infiltration". Carbon 38 (2000) 423-427.*

(Continued)

*Primary Examiner* — Bret Chen
(74) *Attorney, Agent, or Firm* — Weingarten, Schurgin, Gagnebin & Lebovici LLP

(57) ABSTRACT

A method of fabricating a composite material part having carbon fiber reinforcement densified by a matrix, including making a coherent fiber preform of carbon fibers presenting holes formed from at least a first face of the preform, and densifying the preform by depositing therein a material constituting a matrix by means of a chemical vapor infiltration type process. The holes are formed by causing a plurality of non-rotary elongate tools to penetrate simultaneously, the tools being substantially mutually parallel and presenting on their surfaces roughnesses or portions in relief suitable for breaking and/or transferring fibers they encounter, the tools being caused to penetrate simultaneously by moving a support carrying the tools, and the tools being selected to have a cross-section that makes it possible to obtain in the carbon fiber preform holes that present a cross-section with a mean dimension lying in the range 50 μm to 500 μm.

12 Claims, 6 Drawing Sheets

U.S. PATENT DOCUMENTS

| | | | |
|---|---|---|---|
| 2004/0058154 A1* | 3/2004 | Lau et al. | 428/408 |
| 2004/0066431 A1* | 4/2004 | Machida et al. | 347/68 |
| 2005/0176329 A1* | 8/2005 | Olry et al. | 442/388 |
| 2009/0078514 A1* | 3/2009 | Baud et al. | 188/218 XL |
| 2009/0110877 A1* | 4/2009 | Bernard et al. | 428/131 |

FOREIGN PATENT DOCUMENTS

| | | | |
|---|---|---|---|
| EP | 1 424 423 A | | 6/2004 |
| FR | 2 616 779 A | | 12/1988 |
| WO | WO 02/070775 | * | 9/2002 |
| WO | WO 2006/129040 | * | 12/2006 |

OTHER PUBLICATIONS

Delhaes, P., et al., "Chemical vapor infiltration of C/C composites: Fast densification processes and matrix characterizations". Carbon 43 (2005) 681-691.*

Chen, Bo, et al., "Erosion resistance of needled carbon/carbon composites exposed to solid rocket motor plumes." Carbon 47 (2009) pp. 1474-1479.*

Chen, Tengfei, et al., "Effects of needle-punched felt structure on the mechanical properties of carbon/carbon composites". Carbon 41 (2003) pp. 993-999.*

* cited by examiner

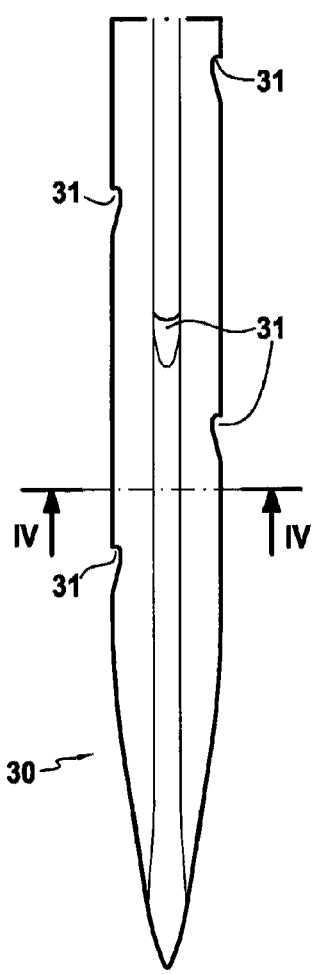 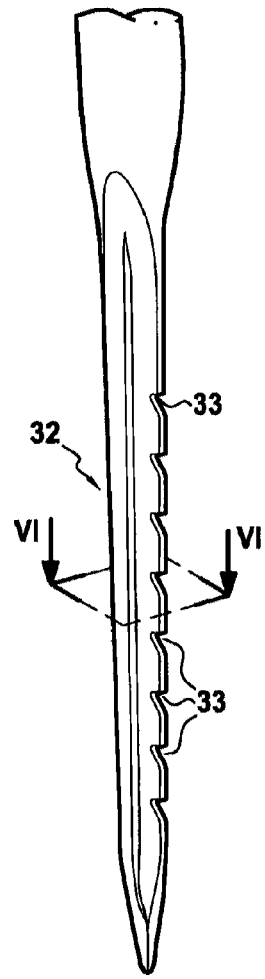 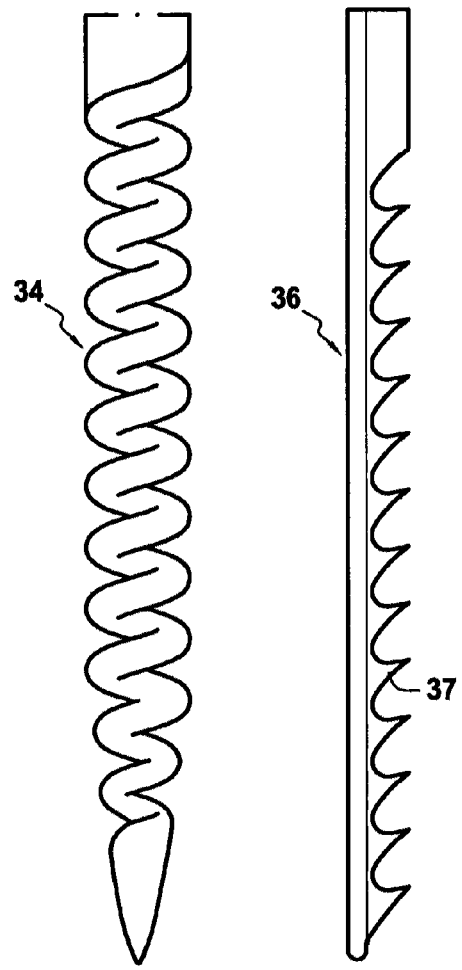
FIG.3    FIG.5    FIG.7    FIG.8
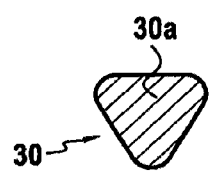 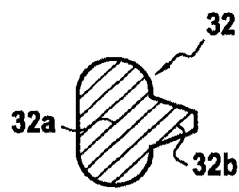
FIG.4    FIG.6

METHOD OF FABRICATING CARBON FIBER REINFORCED COMPOSITE MATERIAL PARTS

This application claims priority to French application No. 07 59465 filed Nov. 30, 2007.

BACKGROUND OF THE INVENTION

The present invention relates to making carbon fiber reinforced composite material parts that are densified by a matrix made at least in part by a chemical vapor infiltration (CVI) type process.

A particular, but non-exclusive, application of the invention lies in making brake disks out of carbon/carbon (C/C) composite material, in particular for airplane brakes comprising an assembly of alternating stator and rotor disks on a common axis. Nevertheless, the invention is applicable to making other C/C composite material parts and to making parts out of other carbon fiber reinforced composite materials, in particular out of ceramic matrix composite (CMC) material or out of composite materials having a matrix of both carbon and of ceramic.

It is well known to densify porous substrates, such as fiber substrates, by using a CVI type process.

In a conventional CVI process, substrates for densifying are placed in an oven. A reaction gas is admitted into the oven in order to deposit the matrix-constituting material within the pores of the substrates by decomposition of one or more of the components of the gas or by reaction between a plurality of components under determined conditions, in particular of temperature and pressure.

A major difficulty with CVI type processes lies in minimizing the densification gradient within substrates so as to obtain parts having properties that are as uniform as possible throughout their volume.

While the matrix is being deposited, it tends to build up preferentially in the surface portions of the substrates that are the portions first encountered by the reaction gas. This leads to depletion of the gas that manages to diffuse into the cores of the substrates, and also to premature plugging of the pores in the surface portions of the substrates, thereby progressively diminishing the ability of the gas to diffuse into the cores. Consequently, a densification gradient becomes established between the surface portions and the cores of the substrates.

That is why, in particular when making thick parts, it is necessary in practice, once a certain degree of densification has been achieved, to interrupt the process, withdraw the partially-densified substrates, and then machine their surfaces in an operation referred to as "scalping" so as to re-open their surface pores. Densification can then be continued with the reaction gas having easier diffusion access to the cores of the substrates. For example, when making brake disks, it is common practice to perform at least two CVI densification cycles (cycles I1 and I2) with an intervening scalping operation. In practice, a densification gradient is nevertheless observed in the parts as finally obtained.

In order to avoid generating a densification gradient and to avoid possible scalping operations, it is indeed known to implement a CVI densification method that uses a temperature gradient, i.e. by heating the substrates in non-uniform manner. Non-uniform heating by direct coupling between a susceptor and one or more annular substrates for densification is described in documents U.S. Pat. No. 5,846,611 and EP 0 946 461. Matrix deposition in those zones of the substrates that are less easy for the gas to access is enhanced by raising such zones to a temperature that is higher than the temperature of other portions of the substrates. Nevertheless, that technique is restricted to substrates that are of certain shapes and to substrates that are loaded in the oven in certain arrangements.

Document U.S. Pat. No. 5,405,560 proposes facilitating access for the reaction gas to the cores of substrates constituted by annular fiber preforms for C/C composite material brake disks by providing passages in the form of holes that extend through the preforms between their opposite faces. Those holes are provided by inserting needles that push away the fibers of the preforms without damaging them. During CVI densification, the holes provide the gas with short-cut paths for reaching the central portions of the preforms. Parallel document FR 2 616 779 does indeed also mention the possibility of making holes by means of a fluid under pressure that destroys the fibers in part, but it recommends avoiding damaging the fibers.

In contrast, document WO 2006/129040 proposes making holes in a fiber substrate by removing material by breaking fibers, e.g. by machining using a jet of water under high pressure or by mechanical machining, with the purpose being to conserve a substantially unmodified arrangement for the fibers, in particular in the walls of the holes. Densifying such a substrate by means of a CVI type process is found to be practically uniform, with the extent to which densification gradient is reduced being better than with the method of document U.S. Pat. No. 5,405,560.

Tests performed by the Applicant have shown that the effectiveness with which the fiber substrate is perforated for the purpose of reducing the densification gradient is related to the open area of the substrate, i.e. when considering the face of the substrate into which the holes open out, the percentage of the area that is occupied by the holes compared with the total area of said face. More precisely, increasing the open area leads to a reduction in densification gradient.

For given hole density, i.e. for given number of holes per unit area in the face of the substrate where the holes open out, an increase in the open area can be obtained by increasing the cross-section of the holes.

Beyond a certain threshold, increasing the cross-section of the holes presents drawbacks. The resulting composite material becomes less uniform. Furthermore, at least in certain applications, the presence of holes that are not closed during substrate densification alters the properties of the resulting part. Thus, with a brake disk, tests performed by the Applicant have shown that above a certain threshold, the presence of non-plugged holes in the composite material leads to significantly greater wear of the composite material. This can be explained by the action on the edges of the holes while the brake disk is rubbing against another disk. It is possible to envisage plugging the holes after densification. That is mentioned in above-mentioned document U.S. Pat. No. 5,405,560 which recommends forming holes having a diameter in the range 0.5 millimeters (mm) to 5 mm. Plugging the holes requires an additional operation, which increases fabrication costs and does not prevent the material from being substantially non-uniform.

Increasing the open area by increasing hole density, i.e. the number of holes, raises the problem of making a large number of holes of relatively small cross-section. The Applicant has established that in order to obtain a result that is meaningful in terms of gradient reduction, and thus in terms of reducing the duration of densification, while ensuring wear is analogous to that of airplane brake disks fabricated from substrates having no holes, it is necessary to form more than 1000 holes in the surface of a disk having a diameter of 20 inches. This is difficult to envisage using the technique described in documents U.S. Pat. No. 5,405,560 and WO 2006/129040, if it is desired to achieve a favorable balance between making savings during densification and increasing fabrication costs to make the holes.

OBJECT AND SUMMARY OF THE INVENTION

An object of the invention is to provide a method of fabricating composite material parts having carbon fiber reinforcement densified by a matrix, at least in part by means of a CVI type process, which method makes it possible to reduce the densification gradient without significantly increasing fabrication costs.

This object is achieved by a method comprising the steps of:
  making a coherent fiber preform of carbon fibers presenting holes that are formed in at least a first face of the preform; and
  densifying the preform by a chemical vapor infiltration type process to deposit therein a material constituting the matrix;
in which method, in accordance with the invention:
  the holes are formed by simultaneous penetration of a plurality of non-rotary elongate tools that are substantially mutually parallel and that present on their surfaces roughnesses or portions in relief suitable for breaking and/or transferring fibers they encounter, the simultaneous penetration of the tools being achieved by moving a support carrying the tools; and
  the tools are selected to have a cross-section making it possible, within the carbon fiber preform, to obtain holes having a cross-section of mean dimension lying in the range 50 micrometers ($\mu m$) to 500 $\mu m$.

The method is remarkable in that it makes it possible to make a large number of holes simultaneously by inserting elongate tools that extend substantially parallel to one another. Advantageously, such tools are barbed needles. Other tools could be used such as corkscrew-shaped rods, wire saw blades, . . . .

Another remarkable aspect of the invention is that in spite of the arrangement of the fibers being modified along the walls of the holes relative to their arrangement prior to perforation, tests have been performed that show that very good results are obtained in terms of densification.

According to a feature of the invention, the preform made of carbon fibers is provided with holes at a mean density, measured in said first face, that lies in the range 0.25 holes per square centimeter ($holes/cm^2$) to 16 $holes/cm^2$.

According to another feature of the method, the fiber preform made of carbon fibers is provided with an open area, measured in said first face, that lies in the range 0.025% to 2% of the total area of said first face.

Advantageously, the tools are caused to penetrate over a distance corresponding to at least half the dimension of the preform measured parallel to the holes between the first face of the preform and a face opposite thereto.

When the fiber preform made of carbon fibers is made by preparing a coherent fiber preform out of carbon-precursor fibers and carbonizing the fiber substrate to transform the carbon precursor into carbon, the holes may be formed after carbonizing the fiber substrate or before carbonizing it. If the holes are made beforehand, in order to obtain the desired cross-sectional dimension for the holes, it is necessary to take account of the shrinkage that occurs during carbonization.

When the fiber preform made of carbon fibers is made by preparing a coherent fiber substrate directly from carbon fibers, possibly followed by heat treatment for additional carbonization of the fiber substrate, the holes may be made in the fiber substrate before or after the additional heat treatment. When the holes are made beforehand, in order to obtain a desired cross-section for the holes, it is not necessary to take account of shrinkage, since the additional carbonization heat treatment does not induce significant shrinkage.

In a particular implementation of the method, the holes may be formed while the fiber substrate is being made out of carbon-precursor fibers or out of carbon fibers. When making the fiber substrate includes a step of needling superposed fiber plies together, the holes can be made simultaneously with that needling, e.g. by mounting on a common support both the tools used for forming the holes and the needles used for needling.

The invention also provides a brake disk of carbon-fiber reinforced composite material as obtained by the above-defined method.

BRIEF DESCRIPTION OF THE DRAWINGS

The invention can be better understood on reading the description made below by way of non-limiting indication and with reference to the accompanying drawings, in which:

FIG. 3 is a detail view of a needle used in the FIG. 2 setup;

FIG. 4 is a cross-section view on plane III-III of FIG. 3;

FIG. 5 is a detail view of a variant tool usable in the FIG. 3 setup;

FIG. 6 is a cross-section view of the FIG. 5 needle;

FIGS. 7 and 8 are views of other variant tools usable in the FIG. 2 setup;

DETAILED DESCRIPTION OF IMPLEMENTATIONS OF THE INVENTION

Figure 1:
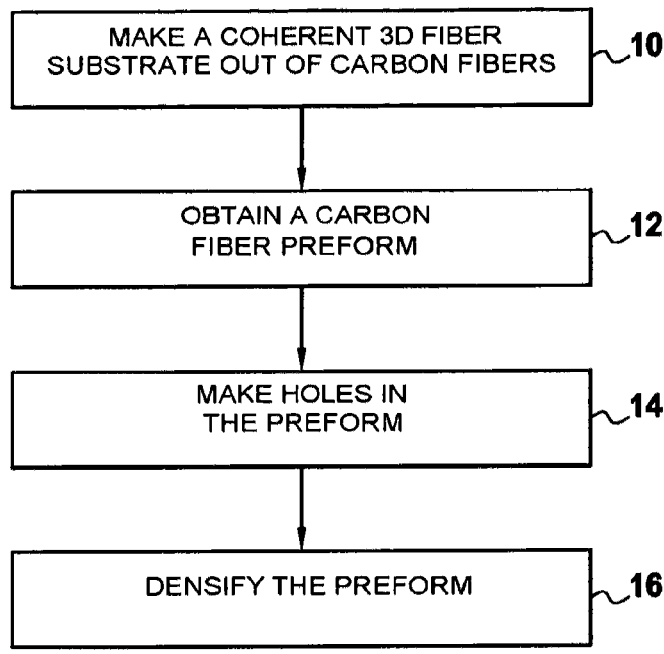
FIG. 1 shows the successive steps in making a composite material part in a first implementation of the method of the invention.

A first step 10 of the method of FIG. 1 consists in making a coherent three-dimensional (3D) fiber substrate out of carbon fibers.

A 3D fiber substrate is said herein to be "coherent" if it is capable of being manipulated without losing its cohesion, even though it presents a certain amount of flexibility.

Various techniques for making coherent 3D fiber substrates are well known.

It is possible to start with unidirectional (1D) fiber elements such as yarns or tows that are used for forming a 3D substrate directly by weaving, knitting, or three-dimensional braiding.

It is also possible to start from two-dimensional (2D) fiber textures such as fabrics, knits, flat braids, thin felts, unidirectional (UD) sheets made up of mutually parallel yarns or tows, or indeed multidirectional (nD) sheets made up of UD sheets superposed in different directions and bonded together by light needling or by stitching. Plies made up of such 2D fiber textures are superposed flat or draped on a shaper and they are bonded together by needling, by stitching, or by implanting yarns through the plies to obtain a 3D fiber substrate. By way of example, document U.S. Pat. No. 5,792,715 a method of making 3D fiber substrates out of composite material to form thick annular fiber preforms for brake disks. In that method, plies cut out from nD sheets are superposed and bonded together by needling progressively as they are superposed one on another.

The fiber substrate may be made from carbon fibers or from carbon-precursor fibers that may be more suitable for withstanding the various textile operations used for making the 3D fiber substrate. Under such circumstances the precursor is transformed into carbon by applying heat treatment after the fiber substrate has been formed.

A carbon fiber preform of shape close to that of a part that is to be made can be obtained (step 12):

- directly in the form of a fiber substrate made of carbon fibers;
- by being cut out from a fiber substrate made of carbon fibers;
- directly by carbonizing a fiber substrate made of carbon-precursor fibers;
- by carbonizing a fiber substrate made of carbon-precursor fibers and by being cut from the carbonized fiber substrate; or
- by cutting out a preform from a fiber substrate made of carbon-precursor fibers, and by carbonizing the preform.

In the first two possibilities and in known manner, after a fiber substrate has been made from carbon fibers, high temperature heat treatment (HTHT) can be performed at a temperature higher than that reached during carbonization so that the properties of the fibers are modified and impurities contained therein, if any, are eliminated.

With 3D fiber substrates for forming annular fiber preforms for brake disks out of composite material, it is common practice to make 3D fiber substrates from carbon-precursor fibers, e.g. such as preoxidized polyacrylonitrile (PAN). Carbon-fiber brake-disk preforms are then obtained by cutting out portions having a disk shape from the 3D fiber substrate made of carbon-precursor fibers and by carbonizing, with the dimension of the cut-out portions being determined as a function of the dimension of the preforms that are to be obtained and as a function of the shrinkage that occurs during carbonization.

A following step (14) of the FIG. 1 method consists in making holes in the carbon-fiber preform in order to facilitate access for a reaction gas to the core of the preform during subsequent densification thereof by means of a CVI type process.

In a variant, when the preform is obtained by being cut out from a fiber substrate made of carbon fibers, the holes may be formed in the substrate prior to cutting out the preform.

In addition, when the fiber substrate is obtained directly from carbon fibers, the holes may be formed before or after any additional carbonization.

The holes are formed by causing a plurality of elongate tools that extend substantially parallel to one another to penetrate simultaneously through at least one of the faces of the preform, the tools presenting on their surfaces roughnesses or portions in relief suitable for breaking and/or transferring fibers they encounter during penetration into the preform, and for doing so preferably on a majority of the fibers they encounter. Such tools may advantageously be constituted by barbed needles.

In cross-section, the size of the holes formed is preferably selected to be large enough to provide a reaction gas with access to the core of the preform without being closed off prematurely by matrix deposition during densification, and the holes may be of greater cross-sectional area when the holes pass through a greater thickness of preform.

Nevertheless, the size of the holes must remain limited so as to ensure that, after densification, no residual holes of too great a size remain that might alter the behavior of the part that is made, for example when making brake disks, that might lead to high levels of premature wear. With brake disks, the presence of residual holes of small section can be tolerated insofar as they become plugged quickly by particles produced by friction.

The mean cross-sectional dimension of the holes thus preferably lies in the range 50 µm to 500 µm. The holes are not necessarily in the form of regular circles, given the shape of the tools used, the direction of the fibers, and the way some of the fibers return towards their original positions after the tool has passed through, but not necessarily in regular manner. That is why the dimension under consideration is not a hole diameter but a mean cross-section dimension, determined by measuring the area occupied by the hole in the face through which it is formed, and then calculating the diameter of a circle that presents the same area.

It is also important for the distance between the holes to be small enough to guarantee that the reaction gas has easy access to all zones within the preform, but to do so without multiplying the number of holes excessively in order to avoid altering the mechanical properties of the part made and to avoid altering the tribological properties when the part is a brake disk.

That is why the mean hole density preferably lies in the range 0.25 holes/cm$^2$ to 16 holes/cm$^2$, where density is measured over the or each face of the preform through which the holes are formed.

Also preferably, for the reasons mentioned above, it is desirable to form the holes in such a manner as to obtain an open area lying between 0.025% to 2%, where the open area is the fraction of the total area that is occupied by the holes in the or each face of the preform through which the holes are formed.

Figure 2:
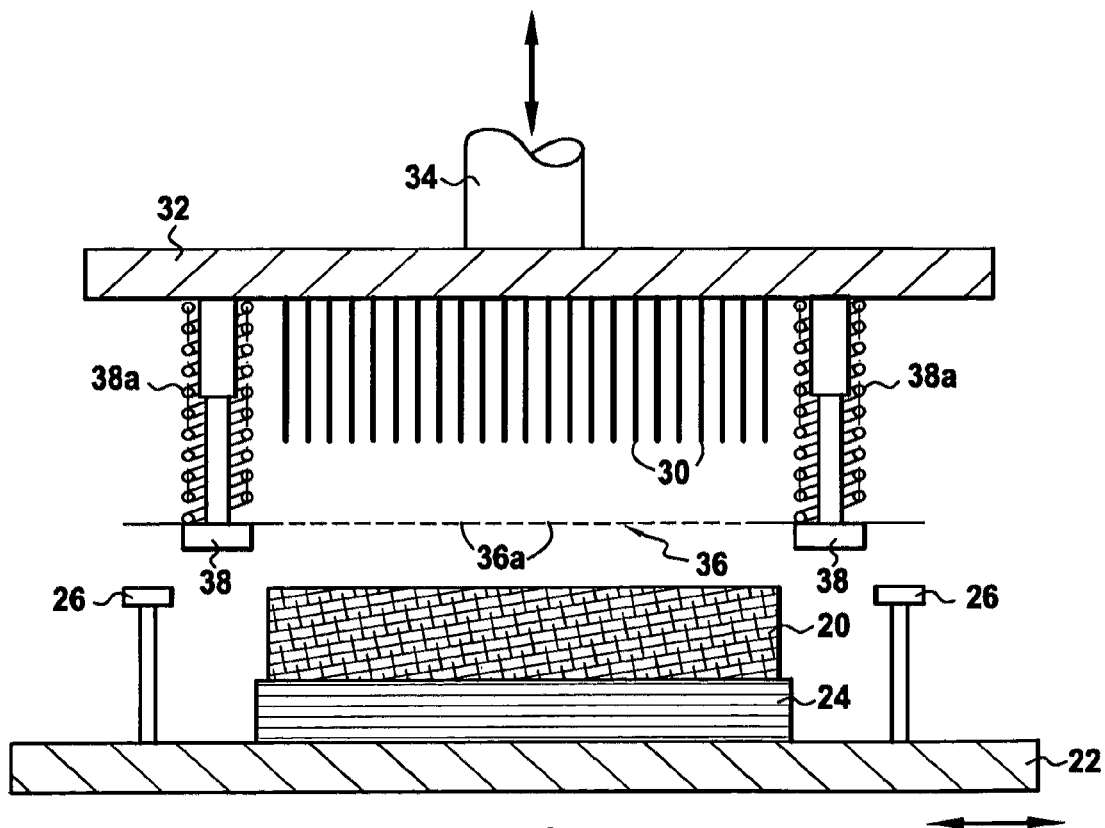
FIG. 2 shows a setup enabling a plurality of holes to be formed simultaneously in a fiber substrate.

FIG. 2 shows a setup enabling holes to be formed in a preform 20 for a brake disk, the preform being obtained by being cut out from a 3D fiber substrate made of carbon-precursor fibers and by carbonizing.

The preform may be an annular preform, e.g. obtained by being cut out from a fiber substrate. It is also possible to form the holes in a preform that is in the shape of a complete disk from which the central portion is subsequently removed by being cut out so as to obtain a preform for densification that presents an annular shape close to that of the brake disk that is to be obtained.

A plurality of needles 30 extend vertically in one or more rows and they are secured to a common support 32 or needle board of circular shape. The needle board 32 is connected to a member 34 serving to impart movement in vertical translation to the needles in one direction and in the opposite direction, e.g. the moving member of a press.

The preform 20 is supported horizontally by a horizontally-movable base plate 22, with a base layer 24 being interposed into which the ends of the needles 30 can penetrate without being damaged. By way of example, the base layer 24 is a relatively rigid perforated structure such as a carbon foam, or a sacrificial disk preform made of carbon fibers. It is also possible to use a base plate 22 having holes, with the pitch of the holes in the base plate 22, the pitch of needles and the direction of relative horizontal movement between the base plate 22 and the board 32, when it occurs, being such that, on moving vertically, each needle is always in register with a hole in the base plate 22.

An unjamming plate 36 is supported by the head-shaped ends 38a of rods 38 that extend vertically from the bottom face of the needle board and that are carried thereby, outside the set of needles 30. The rods 38 can slide in holes formed in the unjamming plate 36. Helical springs 38a are mounted around the rods 38 between the needle board 32 and the unjamming plate 36. The unjamming plate 36 has perforations 36a for passing the needles 30. When the needle board 32 is lowered, the unjamming plate 36 bears against abutments 26 carried by the base plate 22 and the needles penetrate into the preform 20 by passing through the perforations 36a, with the springs 38a being compressed. The downward movement of the needles is defined by the stroke of the press.

When the needle board is subsequently raised, the unjamming plate 36 is held pressed against the preform 20 by the springs 38a for the length of time needed to allow the needles to be extracted from the preform.

A hole-formation cycle may comprise one or more cycles of needle penetration and withdrawal and can enable several hundreds of holes to be formed simultaneously. The needles 30 are mounted on the needle board 32 at substantially regular spacing. The holes can be made using a single needle penetration and withdrawal cycle for a given area of the preform, with the pitch of the needles 30 on the board 32 then matching the pitch of the holes that are to be formed in the preform. It is also possible to make the holes in a given area of the preform using a plurality of cycles with the preform 20 being moved horizontally by moving the base plate 22 between two successive cycles. The pitch of the needles 30 on the board 32 is then a function of the amplitude of the displacement of the preform relative to the needle board between two successive cycles, and of the hole pitch that is be achieved.

FIGS. 3 and 4 are detail views showing an example of a suitable barbed needle. The needle 30 has a working section 30a that is substantially triangular in shape with rounded edges along which barbs 31 are formed. The barbs are formed by hooked-shaped recesses and they are distributed substantially regularly along the needle, being formed in succession on the three edges. Such needles are themselves known as "felting" needles that are used for needling fiber textures. While the needle is penetrating into the preform, most of the fibers encountered by the barbs 30a are cut, while some of them are transferred.

FIGS. 5 and 6 are detail views of another type of barbed needle, the needle 32 having a working section 32a in the form of a drop of water from which there projects an edge 32b having barbs 33 formed therealong.

Tools other than barbed needles can be used, for example corkscrew rods 34 as shown in FIG. 7, or wire saw blades 36 as shown in FIG. 8, having teeth 37.

The mean cross-sectional dimension of the holes formed varies as a function of: the working section of the tools; the characteristics of the roughnesses or portions in relief formed on the tools; the number of penetrations performed for each hole; the striking speed of the tools; and the characteristics of the preforms to be pierced. The term "working section" of the tool is used to mean the section of the portion of a tool presenting barbs, teeth, or other roughnesses or portions in relief. Under all circumstances, in order to obtain a hole of desired section, a tool is selected that has a working section that is substantially greater than the desired section, in order to take account of the fact that the fibers pushed back by the tool during penetration tend to return towards their original position after the tool has been withdrawn. Thus, for example, when forming holes in a needled preform made of carbon fibers by using tools such as the felting needles shown in FIGS. 3 and 4, needles are selected that have a working section that is several times greater than the section of the holes to be made. With other tools and other types of preform, the working section corresponding to a desired hole section can readily be determined by experiment.

The depth of the holes formed varies as a function of the penetration distance of the barbs or other roughnesses of the tool into the preform, and as a function of the characteristics of the preform to be pierced. It should be observed that with a needle of the kind shown in FIGS. 3 and 4, the effective working length for forming a hole does not extend as far as the point of the needle, since the fibers are not durably displaced by the portion of the needle that extends between its point and the barb that is closest to the point.

Figure 9:
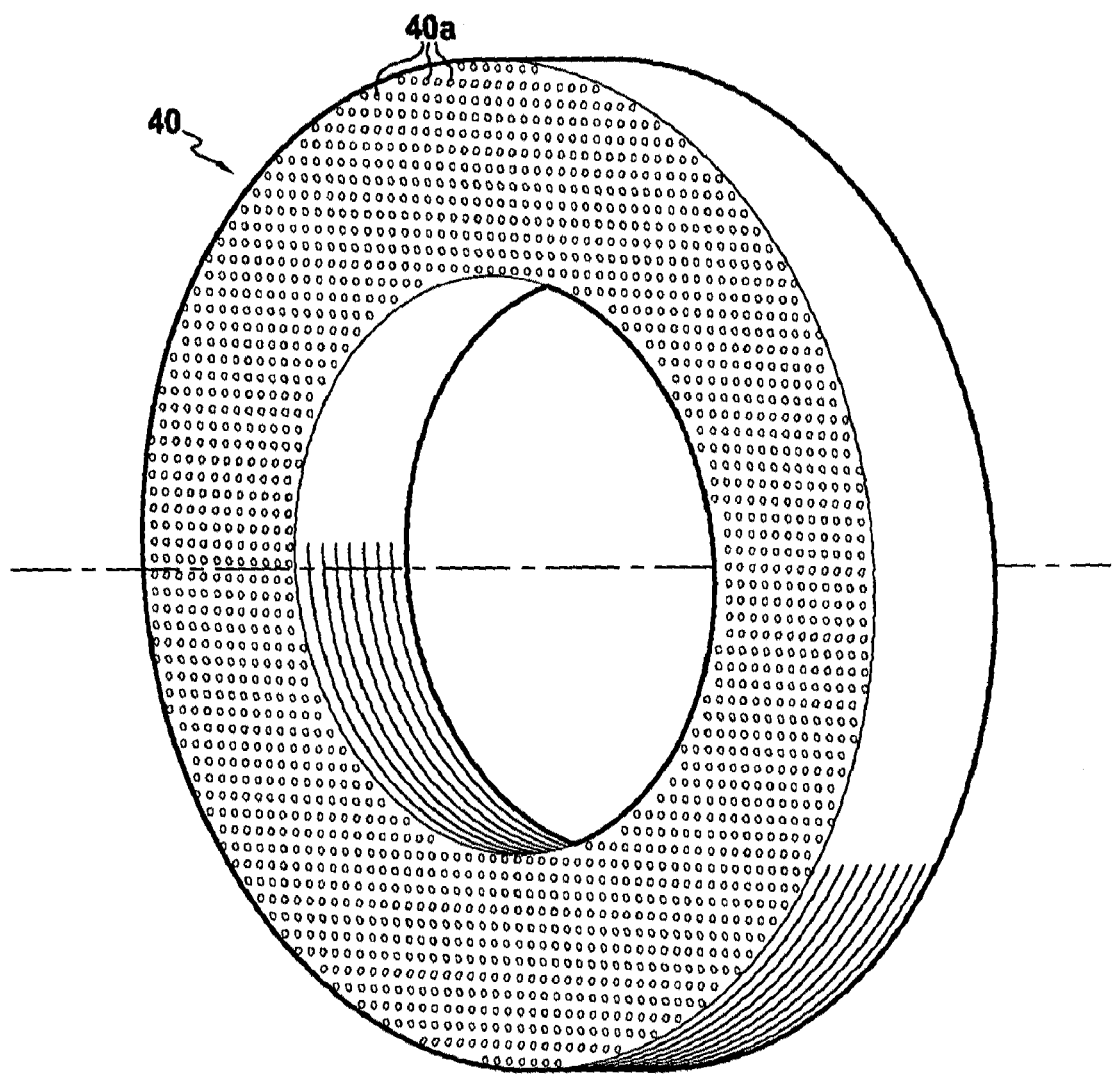
FIG. 9 is a diagrammatic view of an annular fiber preform for a brake disk in which holes have been formed.

FIG. 9 shows an annular fiber preform 40 for a brake disk in which holes 40a have been formed. In this example, the holes are distributed regularly in a mesh of square shape. Other hole distributions could be selected, for example a hexagonal mesh, along concentric circles, . . . .

Figure 10:
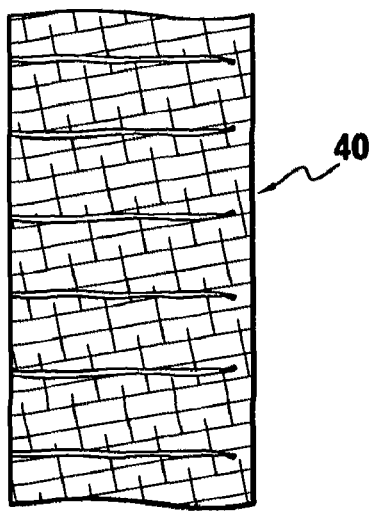
FIGS. 10 to 13 are fragmentary section views showing various ways of forming holes that open out to at least one of the main faces of a fiber substrate constituting an annular fiber preform for a brake disk.

Provision can be made for the holes to be through holes opening out in two opposite faces of the preform 40, or holes that are almost through holes, i.e. that end a short distance from the face of the preform opposite from the face through which the holes are formed, as shown in FIG. 10. Such holes are obtained by causing the working portions of the needles to pass through the entire thickness or practically the entire thickness of the preform.

Figure 11:
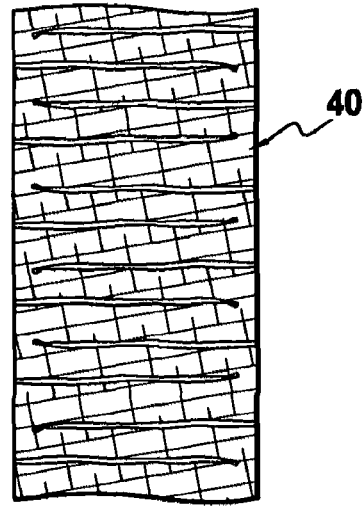
Figure 12:
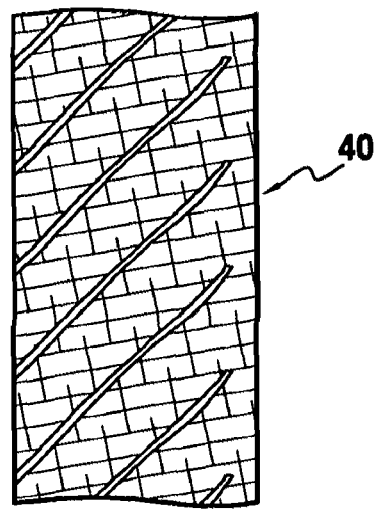
Figure 13:
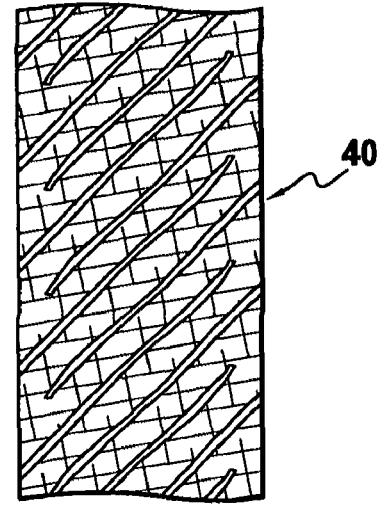

In a variant, the holes formed in the preform 40 can be blind holes formed from two opposite faces of the preform, as shown in FIG. 11, with the holes then extending over a distance that is not less than half the thickness of the preform as measured between said two faces. With a setup of the kind shown in FIG. 2, this can be achieved by forming a first series of holes by causing the tools to penetrate through one face of the preform, without going right through the preform, and then forming a second series of holes in similar manner after turning the preform over.

Also in a variant, the holes formed in the preform may extend on the bias, so as to form a non-zero angle with the normal to the face of the preform through which the tools are inserted. With a setup of the kind shown in FIG. 2, this can be achieved by mounting the needles on the bias on the needle board and by moving the board parallel to the needles. Such holes on the bias may be quasi-through holes or they may be of limited depth as shown in 12 and 13.

After holes have been formed in the carbon fiber preform, the preform is densified by a CVI type process (step 16 in FIG. 1). CVI type densification processes for forming carbon or ceramic matrices are well known.

Figure 14:
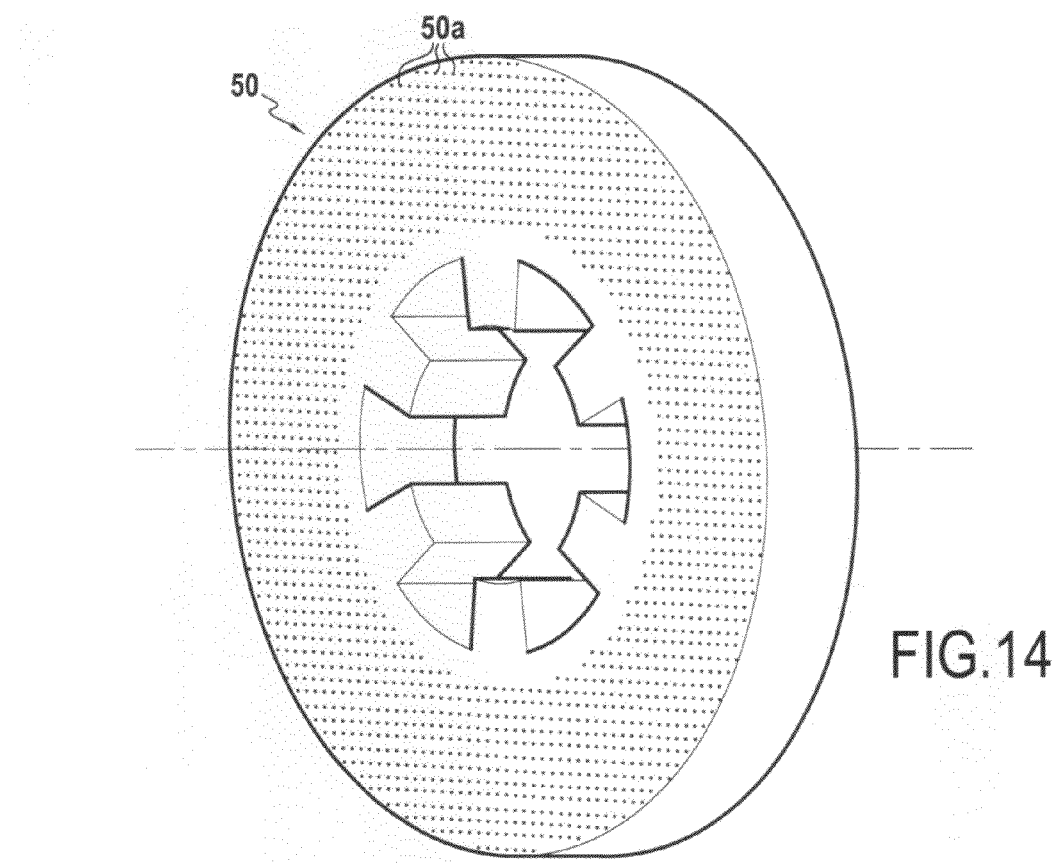
FIG. 14 is a diagram showing a brake disk obtained after CVI type densification and final machining, using a preform of the kind shown in FIG. 9.

FIG. 14 shows a brake disk 50 as can be obtained after densifying the FIG. 9 preform and after final machining. Holes 50a can remain visible and need not be completely plugged during densification, providing they do not alter the tribological and the wear-resistance properties of the disk, in particular providing they are small enough to become plugged very quickly by wear particles.

At least in some circumstances, the method of the invention can make it possible to achieve a desired degree of densification without it being necessary to perform any intermediate scalping of the part. Nevertheless, depending on the thickness of the part that is to be made and on the desired final density, such scalping can be performed.

It should be observed that in the context of the invention, it is not excluded that a step of partial densification by a CVI type process is followed by a final step of densification by a process other than a CVI type process. By way of example, such a final step may consist in a step of siliciding by impregnation with molten silicon after a carbon matrix has been formed.

EXAMPLE 1

Carbon fiber preforms have been made for airplane brake disks as follows:
- forming nD sheets of preoxidized PAN fibers by draping and light needling of three UD sheets forming angles of ±60° between one another;
- forming a 3D fiber preform by superposing and needling together plies obtained from the resulting nD sheets, using the method of document U.S. Pat. No. 5,792,715;
- cutting out disk-shaped portions from the 3D fiber substrate; and
- carbonizing the cut-out portions so as to obtain fiber preforms of disk shape made of carbon fibers.

The resulting preform was densified in conventional manner by CVI to obtain a carbon matrix using a process comprising a first densification cycle of 500 hours (h), scalping, and a second densification of 75 h.

Other preforms as obtained in this way after the carbonization stage were pierced by holes using a setup as shown in FIG. 2 with barbed needles having a triangular working section as shown in FIG. 3 and supplied by the supplier Groz Beckert under the reference 15×18×20×3.5 R33 G 3012, having three barbs per edge. The needles were mounted on a needle board at a pitch of 20 millimeters (mm). The penetration distance was adjusted to pass through the entire thickness of the preform by causing the needles to penetrate 1 mm into the base layer. By moving the base plate carrying the preform, holes were made from each face at a density of one hole every 5 mm on each face, giving a density of 4 holes/cm².

Figure 15:
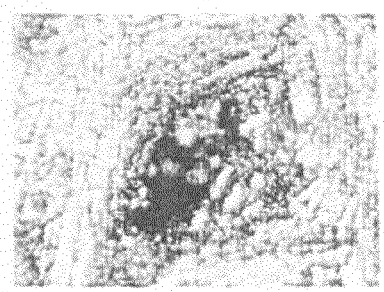
FIG. 15 is a microphotograph showing the opening of a hole formed in an annular fiber preform for a brake disk by means of a tool such as that of FIGS. 3 and 4.
Figure 16:
FIG. 16 is a microphotograph showing a longitudinal section of a hole similar to that shown in FIG. 15.

FIG. 15 shows the opening of a resulting hole. It is substantially oval in shape. When the needles used have a working section in the form of an equilateral triangle with height equal to about 1 mm, it is found that the holes formed present a mean cross-sectional dimension of about 350 µm. FIG. 16 is a longitudinal section of a resulting hole. It can be seen that it extends close to the vicinity of the face of the preform opposite from the face through which the needles were inserted, but without passing right through the preform, the end portions of the needles not being effective for forming a durable hole.

A preform as pierced in that way was densified with a carbon matrix using the same CVI process as that used for the non-pierced preform, but performing a single 500 h densification cycle.

The densified preforms were subsequently machined to the final dimensions of a annular central stator disk for an aviation disk brake (thickness 24.5 mm, inside diameter 248.85 mm, and outside diameter 418.75 mm).

The table below shows the results obtained.

|  | Non-pierced preform | Pierced preform |
| --- | --- | --- |
| Relative density after 500 h | 1.69 | 1.78 |
| Scalping | yes | no |
| Additional densification over 75 h | yes | no |
| Final relative density after machining | 1.75 | 1.77 |

Remarkably, a final density was obtained with the pierced preform that was a little greater than that obtained with the non-pierced preform, without the scalping step, and using only the first densification cycle. The savings thus achieved during densification are considerable, and much greater than the extra cost of piercing the preform, with the method of the invention making it possible to form several hundreds of holes simultaneously quickly and simply.

EXAMPLE 2

Carbon fiber preforms are made for airplane brake disks as in Example 1, some of the preforms being for making rotor disks, other preforms being for making end stator disks, and yet other preforms for making central stator disks (where a brake comprises a stack of stator and rotor disks in alternation).

The preforms for each type of disk were subjected to the following treatments:
A) forming holes by means of needles such as those used in Example 1, to a density of 4 holes/cm² from each of the faces with penetration such that the ends of the needles projected over a length of 6.63 mm so as to ensure that the first barb of each needle went right through the preform and passed out from the opposite face;
B) forming holes as in A), but at a density of 2 holes/cm² from each of the faces;
C) forming holes from only one of the faces using a jet of water under pressure as described in document WO 2006/129040 with a nozzle having an outlet diameter of 0.12 mm, and with hole density of 1 hole/cm²;
D) forming holes as in C), but with a nozzle having an outlet diameter of 0.20 mm;
E) forming holes by means of a laser from a single face only, using a $CO_2$ laser at a power of 3.5 kW and a laser pulse duration of 0.1 seconds (s), the density of the holes being 1 hole/cm²;
F) forming no holes.

The pierced and non-pierced preforms were densified with a carbon matrix using the same CVI process comprising a plurality of densification cycles with a total duration of 600 h, and without intermediate scalping. After densification, the rotor, central stator, and end stator disks were machined to their final dimensions, giving inside diameters of 281.25 mm, 248.85 mm, and 248.85 mm respectively, outside diameters of 450.85 mm, 418.75 mm, and 418.75 mm respectively, and thicknesses of 23 mm, 24.5 mm, and 20 mm respectively.

Table I gives the mean relative density values as measured on each batch of disks of the same type having preforms that were subjected to the same hole formation treatment, if any, and with the number of disks per batch being given in parentheses after the mean relative density value.

TABLE I

|  | A) | B) | C) | D) | E) | F) |
|---|---|---|---|---|---|---|
| Rotor disks | 1.829 (10) | 1.791 (2) | 1.791 (7) | 1.810 (2) | 1.778 (10) | 1.731 (6) |
| Central stator disks | 1.793 (7) | 1.786 (2) | 1.771 (8) | 1.795 (2) | 1.744 (7) | 1.726 (6) |
| End stator disks | 1.827 (6) | 1.819 (2) | 1.819 (8) | 1.869 (2) | 1.797 (6) | 1.770 (6) |

The densities measured when holes were formed in the preforms using needles A) and B) show:
- significant improvement compared with the results obtained with non-perforated preforms F);
- performance that is substantially equivalent and often a little better than that obtained when the holes are formed by a water jet C) or D), or by laser E), but with hole formation being much simpler and quicker; and
- improved performance with higher hole density, A) better than B).

EXAMPLE 3

Carbon fiber preforms for airplane brake disks were made as in Example 2.

Holes were formed in the preforms by means of barbed needles of various types, supplied by the suppliers Foster Needles Co. and Groz Beckert. The preforms with holes were densified, and rotor, central stator, and end stator disks were machined as in Example 2. Table II gives the relative density values measured for each type of disk for different types of needle and different hole densities. The needles in the first four rows were needles from the supplier Foster Needle Co., with working section heights lying in the range 0.45 mm to 0.55 mm, and the other needles were needles from the supplier Groz Beckert with working sections having heights lying in the range 0.7 mm to 1 mm. By way of comparison, the mean relative densities obtained for disks made in the same manner but without holes being formed in the preforms were also measured.

TABLE II

| Type of needle | Hole density (hl) | Number of faces pierced | Rotor disk | Central stator disk | End stator disk |
|---|---|---|---|---|---|
| 15X18X40X3,5 RBA F20 6-2,5 B/CC | 4 hl/cm² | 2 | | | 1.754 |
| 15X18X38X3,5 RB F20 6-3 B/PL | 4 hl/cm² | 2 | | | 1.729 |
| 15X18X36X3,5 RB F20 4-3 B/CC | 4 hl/cm² | 2 | | | 1.728 |
| 15X18X36X3,5 RB F20 6-3 B/PL | 4 hl/cm² | 2 | | | 1.727 |
| 15X18X32X3,5 R 333 G3017 | 4 hl/cm² | 2 | | 1.729 | |
| 15X18X32X3,5 R 333 G3007 | 4 hl/cm² | 2 | 1.732 | 1.717 | 1.766 |
| 15X18X20X3,5 U 333 G1012 | 4 hl/cm² | 2 | | 1.737 | |
| 15X18X32X3,5 R 333 G1002 | 4 hl/cm² | 2 | | 1.740 | |
| 15X18X32X3,5 R 333 G3017 | 4 hl/cm² | 2 | 1.724 | 1.717 | 1.780 |
| 15X16X25X3,5 M 333 G3010 | 4 hl/cm² | 2 | | 1.735 | |
| 15X18X20X3,5 R 333 G3012 | 2 hl/cm² | 2 | 1.743 | | |
| 15X18X20X3,5 R 333 G3012 | 2 hl/cm² | 2 | 1.725 | | |
| 15X18X20X3,5 R 333 G3012 | 2 hl/cm² | 2 | 1.728 | 1.746 | 1.743 |
| 15X18X20X3,5 R 333 G3012 | 2 hl/cm² | 2 | 1.713 | 1.724 | 1.772 |
| 15X18X20X3,5 R 333 G3012 | 4 hl/cm² | 2 | 1.717 | 1.718 | 1.779 |
| 15X18X20X3,5 R 333 G3012 | 4 hl/cm² | 1 | 1.714 | 1.757 | 1.743 |
| 15X18X20X3,5 R 333 G3012 | 8 hl/cm² | 2 | 1.717 | 1.714 | 1.775 |
| 15X18X20X3,5 R 333 G2002 | 2 hl/cm² | 2 | | 1.734 | |
| 15X20X3,5 R 333 G1002 | 4 hl/cm² | 2 | | 1.745 | |
|  | 0 | 0 | 1.675 | 1.691 | 1.736 |

It can be seen that the density of disks obtained from preforms having holes was greater than that of disks obtained from preforms without holes, but that the density does not depend very much on the type of needle used, even though the needles differ not only in their working sections, but also in the numbers, shapes, and depths of their barbs.

Figure 17:
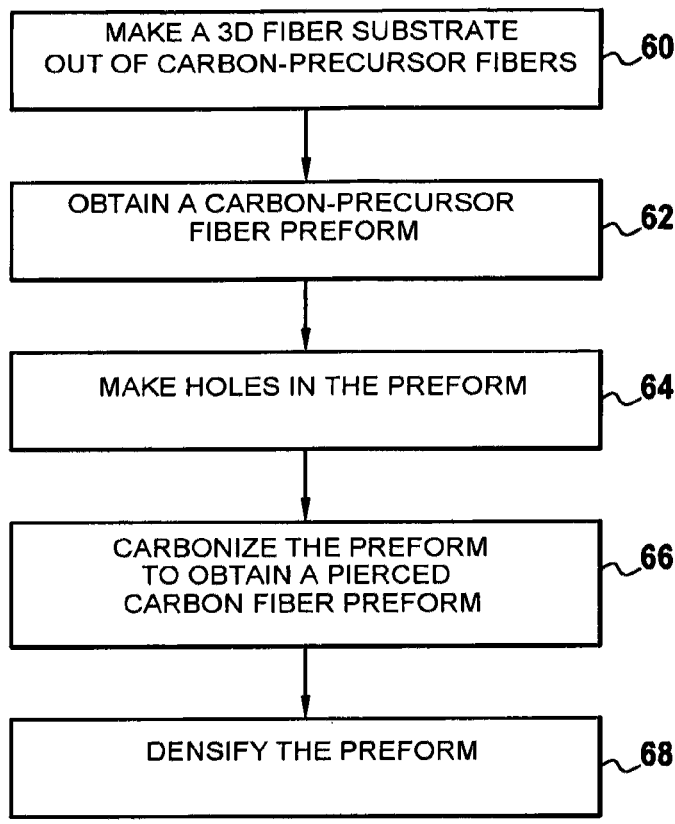
FIG. 17 shows the successive steps in making a composite material part in a second implementation of a method in accordance with the invention.

FIG. 17 relates to another implementation of the method of the invention which differs from the implementation described above with reference to FIG. 2 in that the holes are formed at the carbon-precursor stage.

The method of FIG. 17 comprises in succession a step 60 of forming a 3D fiber substrate of carbon-precursor fibers, a step 62 of obtaining a carbon-precursor fiber preform (insofar as the 3D substrate does not itself constitute such a preform), a step 64 of forming holes in the carbon-precursor fiber preforms, a step 66 of carbonizing the pierced carbon-precursor fiber preform to obtain a pierced carbon fiber preform, and a step 68 of densifying the pierced carbon fiber preform by a CVI type process.

The holes may be formed in the carbon-precursor fiber preform in the same manner as described above for the first embodiment. Nevertheless, for the cross-section dimension of the holes, account needs to be taken of shrinkage during carbonization, with the holes formed in the carbon-precursor fiber preform thus needing to have a section greater than the section desired for the holes in the carbon fiber preform.

In a variant of the second implementation, the holes may be formed not after the 3D fiber substrate of carbon-precursor fibers has been made, but while it is being made. An example of a setup that is suitable for this purpose is shown in FIG. 18.

In this implementation, a 3D fiber substrate made of carbon-precursor fibers is made by superposing and bonding together 2D fiber plies, e.g. multidirectional fiber sheets. The sheets are bonded together by needling using barbed needles, with this being done progressively as the sheets are superposed on one another, bonding being performed by fibers that are transferred transversely relative to the sheets (Z direction) by the action of the needles. Such a method is itself well known. Reference is can be made to above-mentioned document U.S. Pat. No. 5,792,715.

Figure 18:
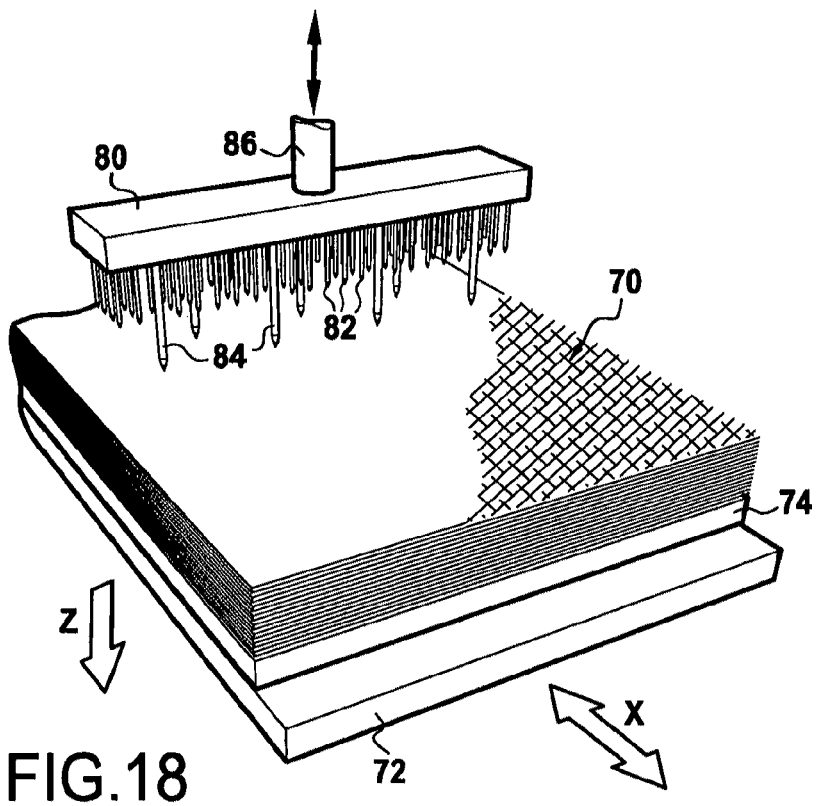
FIG. 18 shows a setup enabling holes to be made in a carbon-precursor fiber substrate in a variant of the second implementation.

As shown in FIG. 18, the fiber substrate 70 that is being built up is supported horizontally by a base plate 72 with an interposed base layer 74.

The needle board 80 carries a plurality of first needles 82, each serving to perform bonding between the plies of the substrate by transferring fibers, and a plurality of second needles 84 serving to form holes in the substrate. The needles 82, 84 extend vertically and the needle board 80 is secured to a member 86 serving to impart vertical translation motion (Z direction) in one direction and in the opposite direction.

The needles 82 and 84 are disposed in one or more rows extending transversely relative to a horizontal direction X in which the base plate 72 can be moved in one direction and in the opposite direction, a new ply being added when the base plate reaches the end of its stroke.

The needles 82 are more numerous than the needles 84 and are of relatively smaller working section. Typically, for barbed needles having a working section of triangular shape, the section height is preferably no greater than 0.6 mm, with the function of the needles 82 being to transfer fibers in the Z direction and not to make holes that persist after the preform has been carbonized.

The needles 84 are present in relatively small number and are of a length and a working section that are greater than those of the needles 82. Preferably, the length of the needles 84 is selected to not less than half the thickness of the fiber substrate that is to be made so as to provide holes that extend from each of its faces at least as far as the midplane of the substrate. The working section of the needles 84 is selected to be sufficiently great to form holes that, after carbonization, present a desired mean dimension of not less than 50 μm. Using barbed needles having a triangular working section, the section height is preferably not less than 1 mm.

The number of needles 84 compared with the number of needles 82 is selected as a function of the desired hole density and as a function of the needling density that is to be performed by the needles 82.

The base plate 72 is movable vertically so as to be capable of being lowered step by step as new plies are placed thereon and so as to control the density of fibers that are transferred in the Z direction throughout the thickness of the fiber substrate.

After the last ply has been needled, finishing needling passes can be performed, possibly with the base plate 72 being lowered stepwise so as to have substantially the same density of holes formed by the needles 84 in each face of the substrate.

Naturally, the needles 84 could be replaced by other tools with roughnesses, as mentioned above.

The operation of forming holes simultaneously with building up a fiber substrate or preform can be performed equally well when the fiber substrate or preform is made of carbon-precursor fibers as when it is made of carbon fibers.

In particular, when making a fiber substrate or a preform directly from carbon fibers using a step of needling together superposed fiber plies, a setup of the kind shown in FIG. 18 can be used for forming the holes simultaneously with the needling.

What is claimed is:

1. A method of fabricating a composite material part having carbon fiber reinforcement densified by a matrix, the method comprising the steps of:
   making a coherent fiber preform of carbon fibers, the making of the fiber preform, including superposing fiber plies and bonding the fiber plies together by needling progressively as they are superposed one on another using first needles having a first working section;
   forming holes in the fiber preform by simultaneous penetration of the preform by a plurality of non-rotary second barbed needles that are substantially mutually parallel and are distinct from the first needles, the simultaneous penetration of the second barbed needles being achieved by moving a support carrying the second barbed needles, the second barbed needles having a working cross-section larger than the working cross-section of the first needles to form within the carbon fiber preform holes extending from at least a first face of the carbon fiber preform and having a cross-section of a mean dimension lying in the range of 50 μm to 500 μm; and
   densifying the preform by a chemical vapor infiltration type process to deposit therein a material constituting the matrix.

2. A method according to claim 1, wherein a fiber preform is made of carbon fibers with holes having a mean density, measured over said first face, lying in the range 0.25 holes/cm$^2$ to 16 holes/cm$^2$.

3. A method according to claim 1, wherein a fiber preform is made of carbon fibers with an open area measured over said first face representing 0.025% to 2% of the total area of said first face.

4. A method according to claim 1, wherein the tools are caused to penetrate over a distance corresponding to at least half the dimension of the preform measured parallel to the holes between the first face of the preform and a face opposite thereto.

5. A method according to claim 1, in which the fiber preform of carbon fibers is made by making a coherent fiber preform out of carbon-precursor fibers and carbonizing the fiber substrate to transform the carbon precursor into carbon, wherein the holes are formed after the fiber substrate has been carbonized.

6. A method according to claim 1, in which the fiber preform of carbon fibers is made by making a coherent fiber preform out of carbon-precursor fibers and carbonizing the fiber substrate to transform the carbon precursor into carbon, wherein the holes are formed in the fiber substrate before the fiber substrate is carbonized.

7. A method according to claim 6, wherein the holes are formed while making the fiber substrate out of carbon-precursor fibers.

8. A method according to claim 7, wherein the second barbed needles are mounted on the same support as the first needles.

9. A method according to claim 1, wherein the fiber preform made of carbon fibers is made by preparing a coherent fiber substrate from carbon fibers and subsequently forming the holes.

10. A method according to claim 1, wherein the fiber preform made of carbon fibers is made by preparing a coherent fiber substrate directly from carbon fibers, followed by a step of additional carbonization, and the holes are formed in the fiber substrate after the additional carbonization.

11. A method according to claim 1, wherein the fiber preform made of carbon fibers is made by preparing a coherent fiber substrate directly from carbon fibers followed by a step of additional carbonization, and the holes are formed in the fiber substrate before the additional carbonization.

12. A method according to claim 1, wherein the second barbed needles have a working cross-section that is several times greater than the section of the holes to be made.

* * * * *